US012455398B2

(12) United States Patent
Malvache

(10) Patent No.: US 12,455,398 B2
(45) Date of Patent: Oct. 28, 2025

(54) METHOD AND INSTALLATION FOR ESTIMATING A CHARACTERISTIC ATMOSPHERIC TURBULENCE PARAMETER

(71) Applicant: UNISTELLAR, Marseill (FR)

(72) Inventor: Arnaud Malvache, Fuveau (FR)

(73) Assignee: UNISTELLAR, Marseill (FR)

( * ) Notice: Subject to any disclaimer, the term of this patent is extended or adjusted under 35 U.S.C. 154(b) by 420 days.

(21) Appl. No.: 18/003,586

(22) PCT Filed: Jun. 29, 2021

(86) PCT No.: PCT/EP2021/067814
§ 371 (c)(1),
(2) Date: Dec. 28, 2022

(87) PCT Pub. No.: WO2022/002917
PCT Pub. Date: Jan. 6, 2022

(65) Prior Publication Data
US 2023/0258842 A1    Aug. 17, 2023

(30) Foreign Application Priority Data
Jun. 29, 2020   (FR) .................................... 2006810

(51) Int. Cl.
*G01W 1/00*    (2006.01)
*G06V 10/774*   (2022.01)

(52) U.S. Cl.
CPC ............ *G01W 1/00* (2013.01); *G06V 10/774* (2022.01); *G01W 2001/003* (2013.01)

(58) Field of Classification Search
CPC ............ G01W 1/00; G01W 2001/003; G06V 10/774; Y02A 90/10; G06F 30/27; G06T 5/60; G05B 2119/45179
See application file for complete search history.

(56) References Cited

U.S. PATENT DOCUMENTS 5,384,455 A  *  1/1995  Paxman ................ G01J 9/00
                                                     356/121
6,216,540 B1 *  4/2001  Nelson ................ A61B 5/0507
                                                      73/633

(Continued)

FOREIGN PATENT DOCUMENTS

| CN | 102662178 A | * | 9/2012 |
| CN | 110083977 A | | 8/2019 |
| EP | 3400474 A1 | | 11/2018 |

OTHER PUBLICATIONS

International Search Report issued on Oct. 27, 2021, in corresponding International Application No. PCT/EP2021/067814, 5 pages.

*Primary Examiner* — Abdullahi Nur
(74) *Attorney, Agent, or Firm* — Maier & Maier, PLLC

(57) ABSTRACT

A method for estimating a characteristic atmospheric turbulence parameter, the method including the steps of: training a machine learning model using, as learning data, values of the characteristic parameter with which are associated optical speckle images corresponding to defocused images of one or more stars, and using the trained learning model to estimate the characteristic parameter from input data containing one or more optical speckle images acquired by at least one measuring telescope, where the speckle images correspond to defocused images of one or more stars observed in real conditions by the telescope.

19 Claims, 12 Drawing Sheets

(56) References Cited

U.S. PATENT DOCUMENTS

| | | | |
|---|---|---|---|
| 6,727,908 B1 | 4/2004 | Wright et al. | |
| 7,531,774 B2* | 5/2009 | Paxman | G01J 9/00 |
| | | | 250/201.3 |
| 9,305,378 B1* | 4/2016 | Holmes | G02B 26/00 |
| 2007/0278386 A1* | 12/2007 | Paxman | G01J 9/00 |
| | | | 348/E5.079 |
| 2012/0078517 A1 | 3/2012 | Bogucki | |
| 2016/0330373 A1* | 11/2016 | Griffin | G02B 26/06 |
| 2019/0028641 A1* | 1/2019 | Rigneault | G02B 6/06 |
| 2019/0105200 A1* | 4/2019 | Hipsley | A61F 9/00838 |
| 2019/0277758 A1 | 9/2019 | Wayne et al. | |
| 2021/0338484 A1* | 11/2021 | Hipsley | A61F 9/00838 |

\* cited by examiner

[Fig. 1]
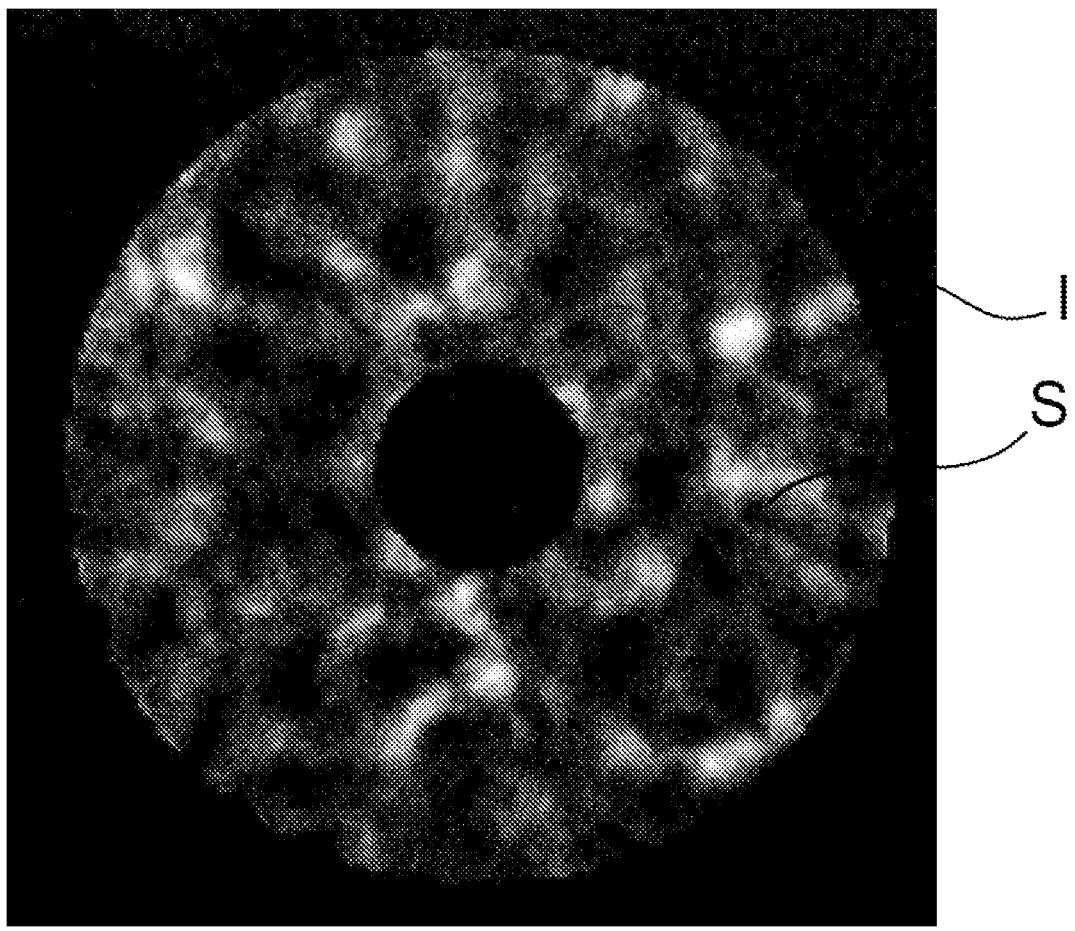

[Fig. 2]
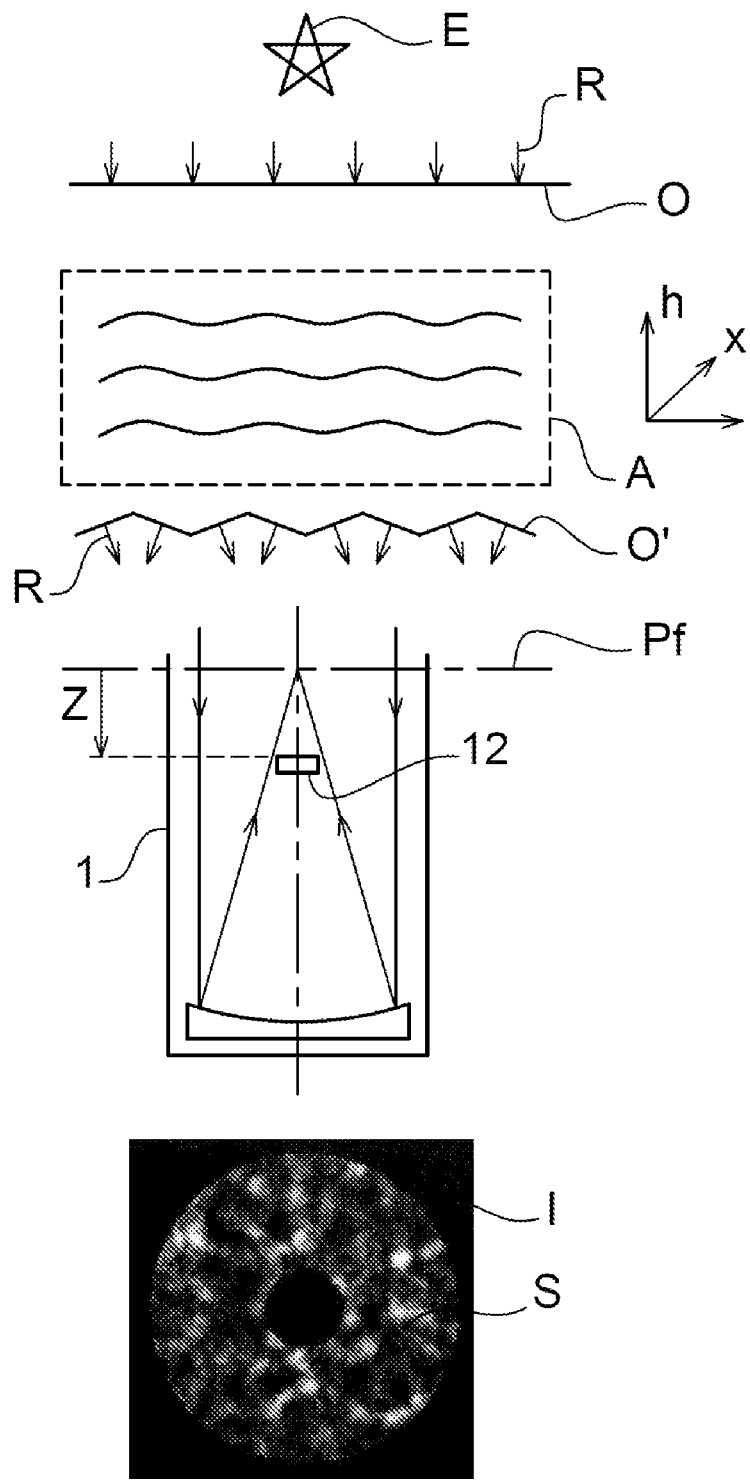

[Fig. 3]
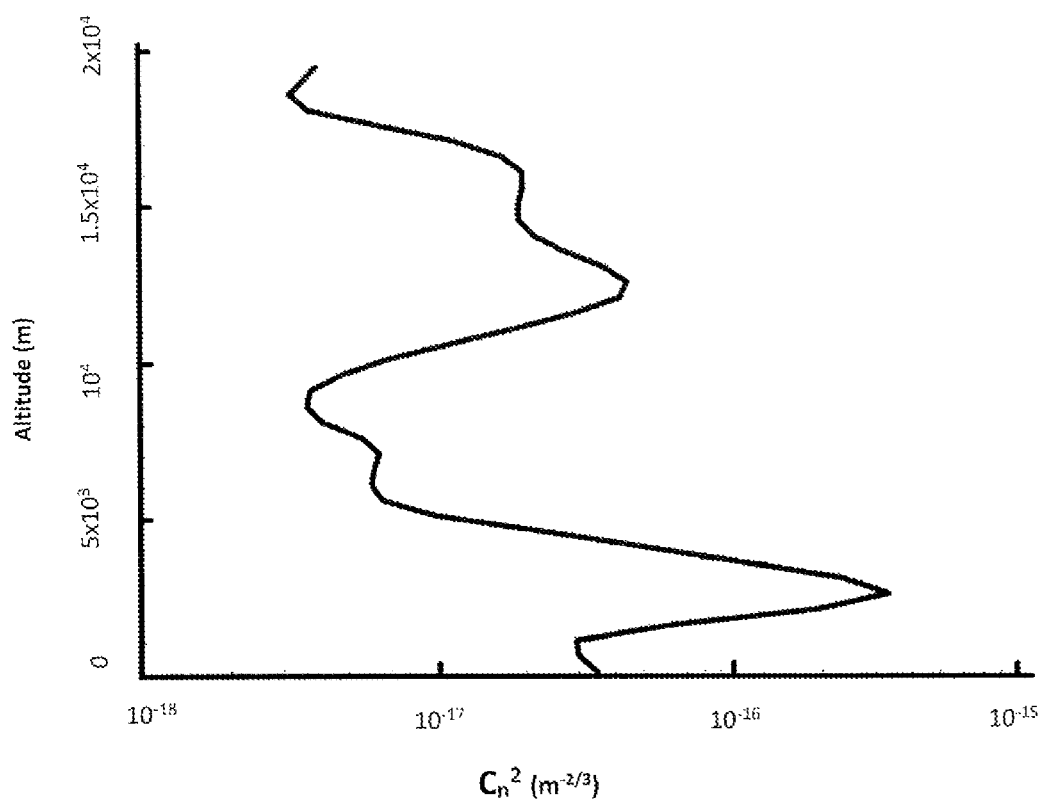

[Fig. 4A]
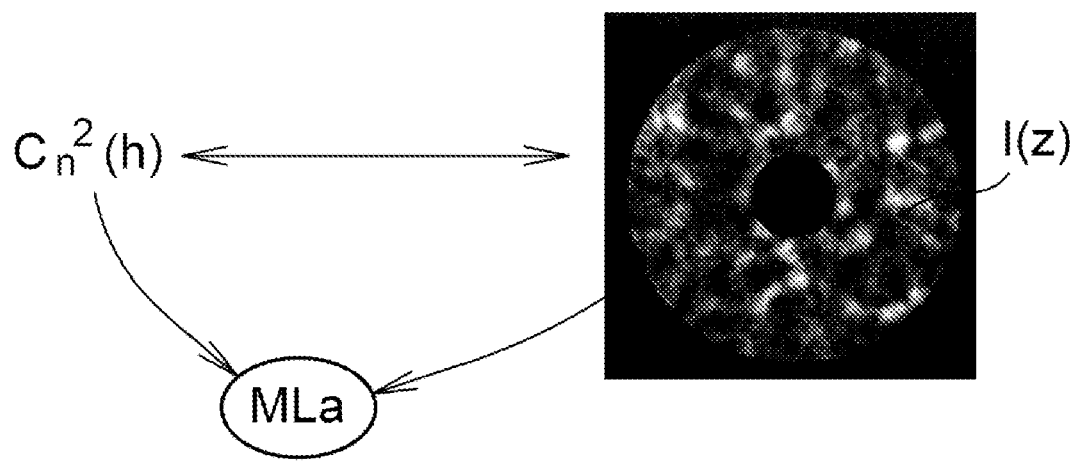
[Fig. 4B]
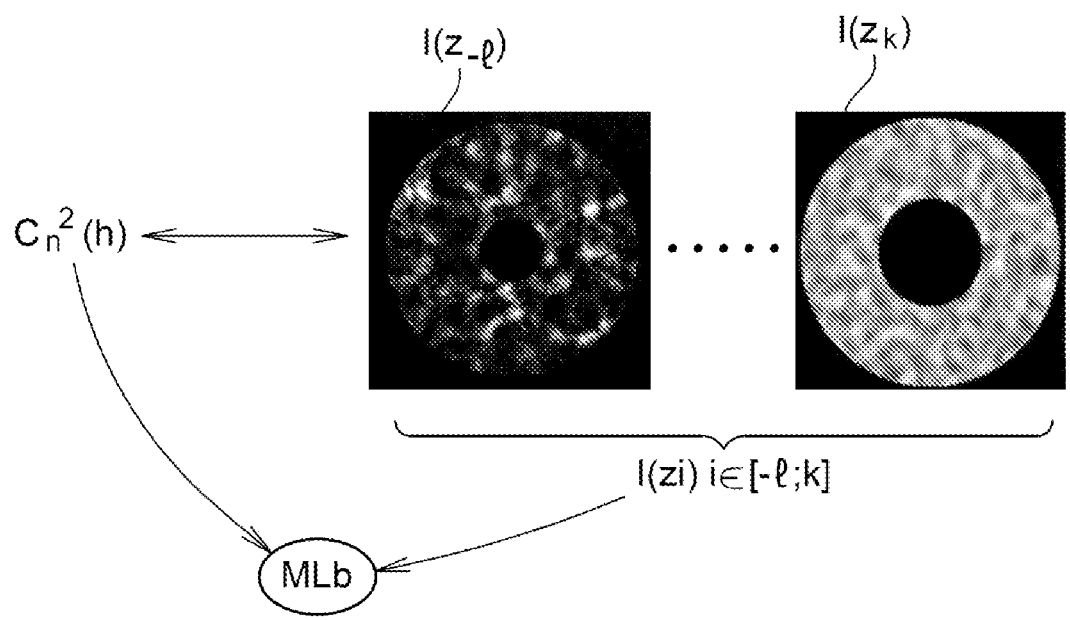

[Fig. 4C]
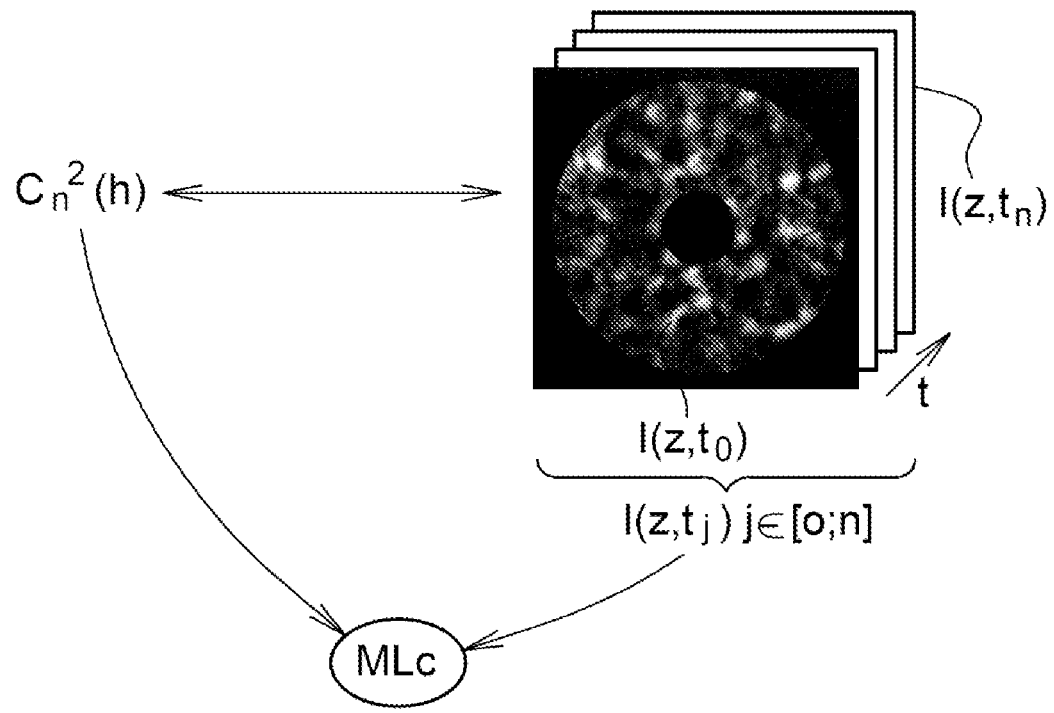

[Fig. 4D]
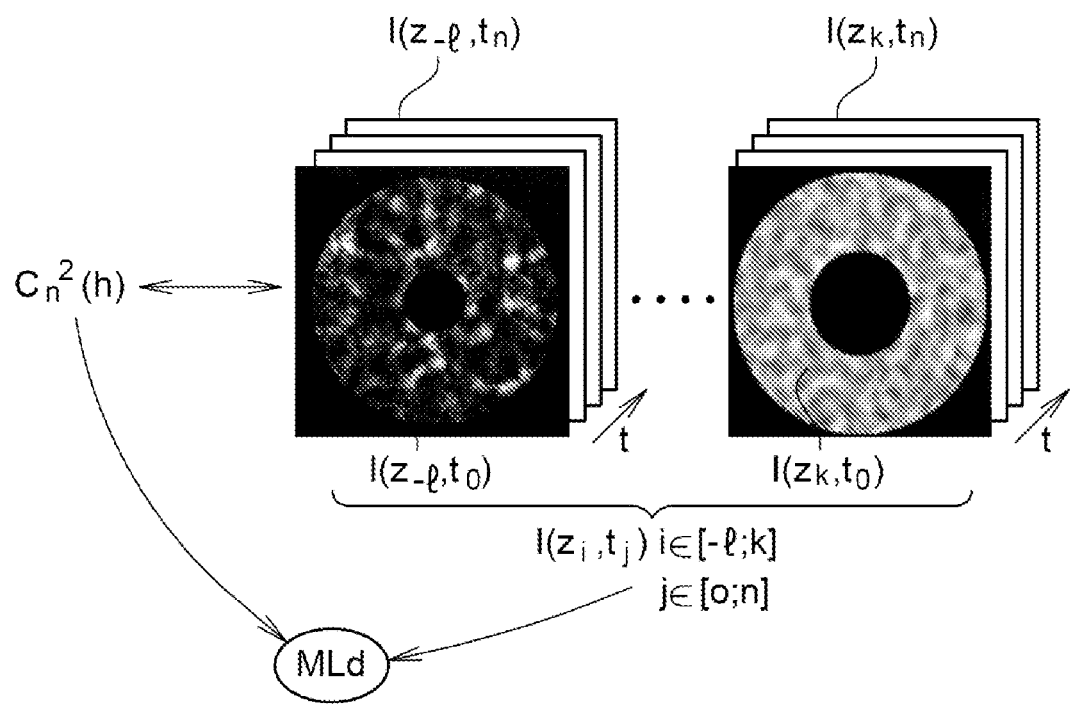

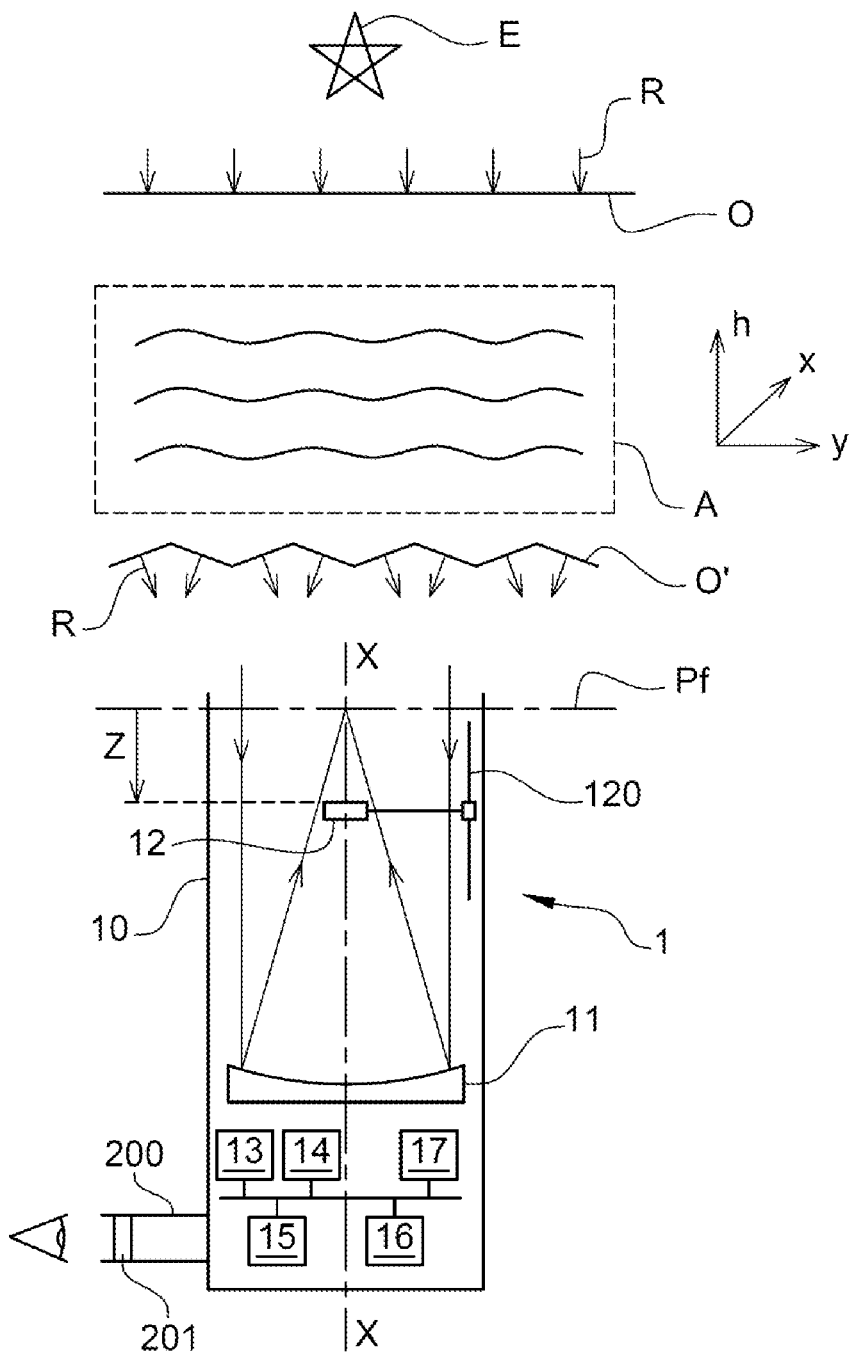
[Fig. 5]

[Fig. 6]
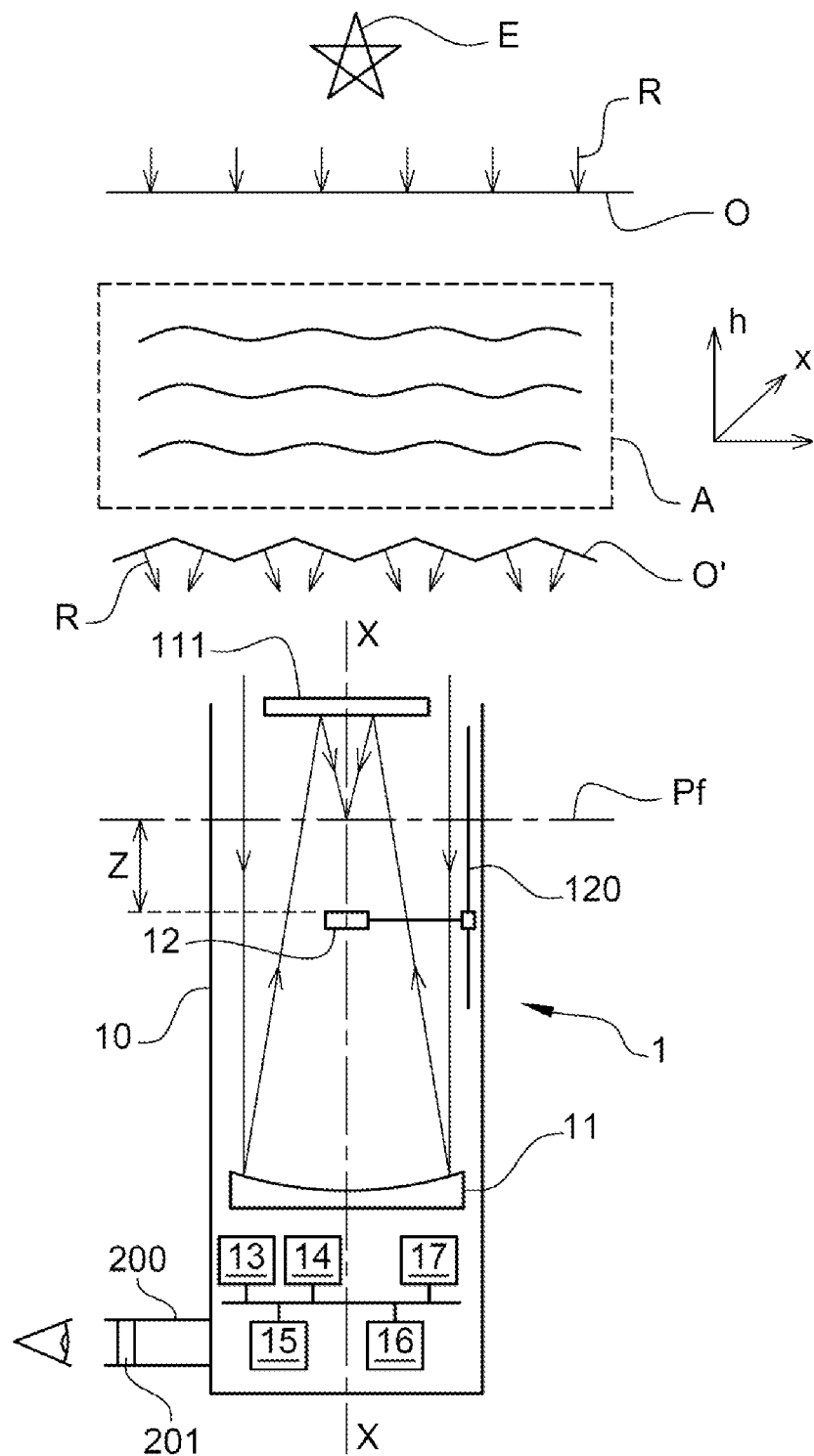

[Fig. 7A]
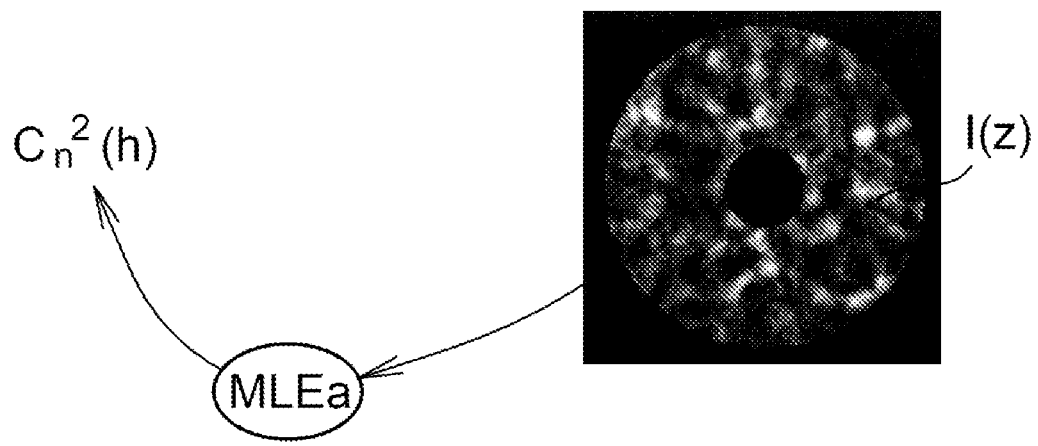
[Fig. 7B]
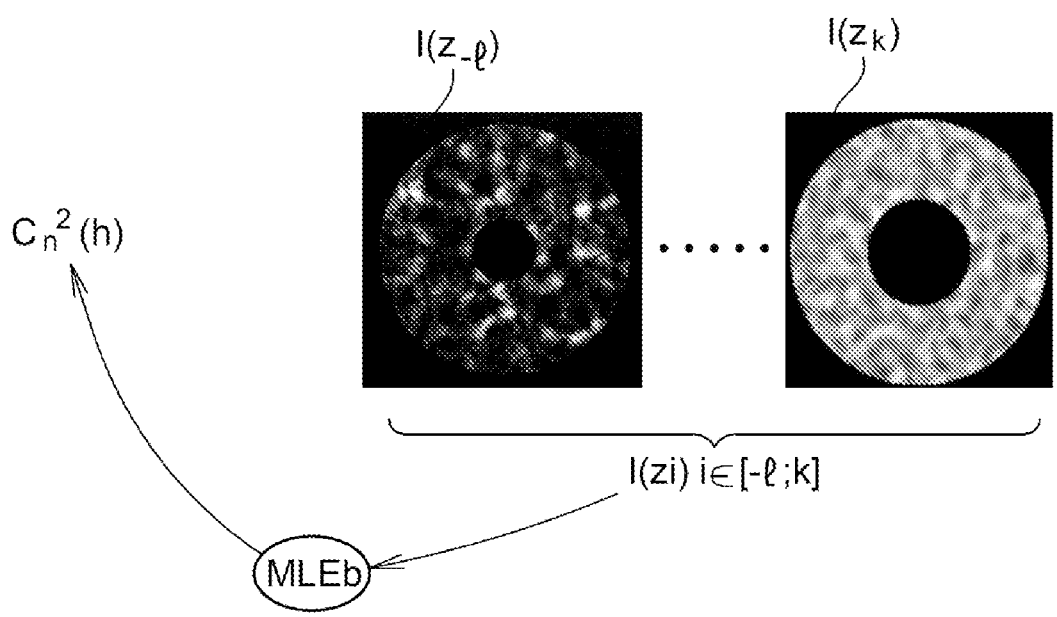

[Fig. 7C]
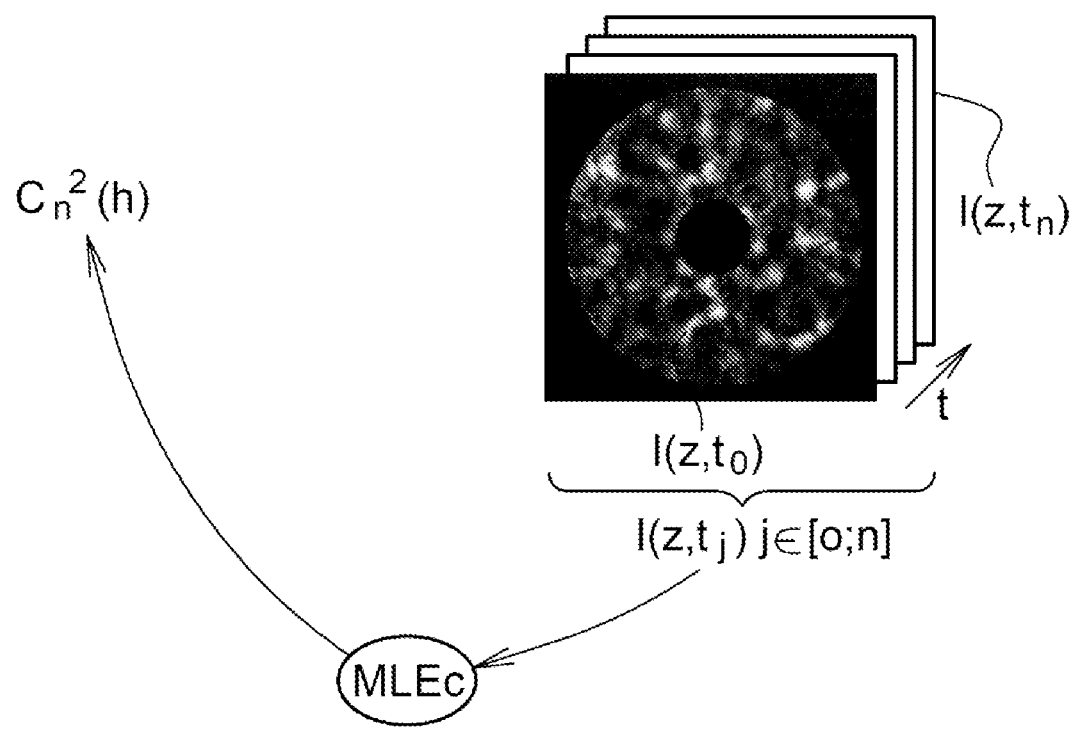

[Fig. 7D]
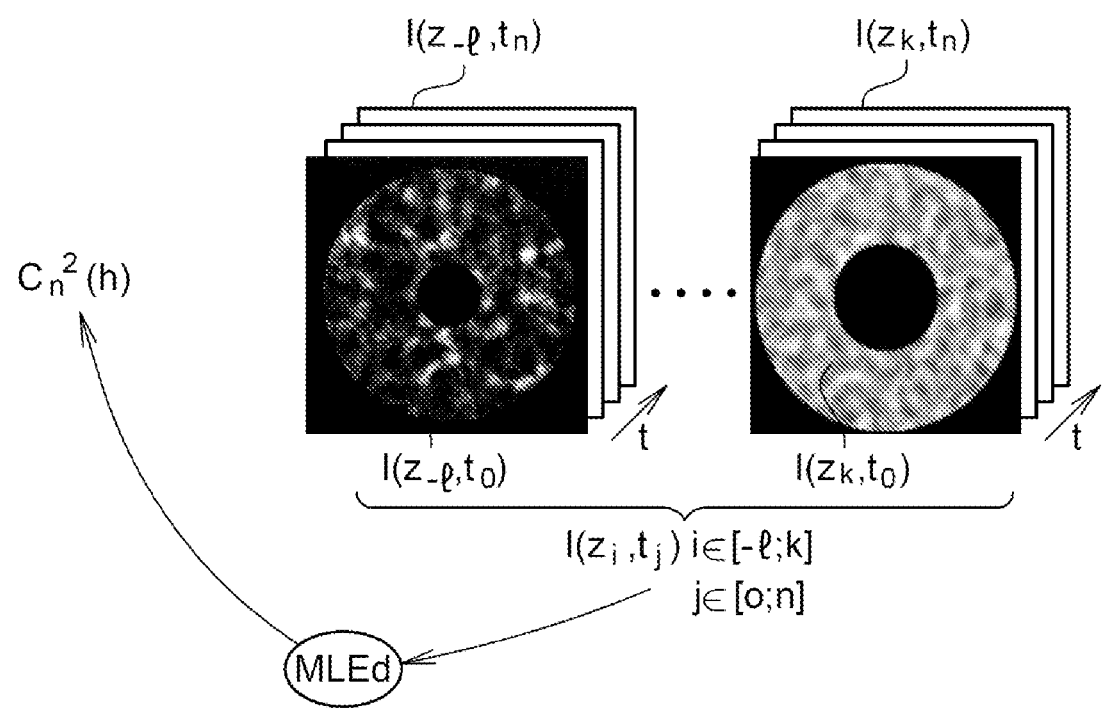

[Fig. 8]
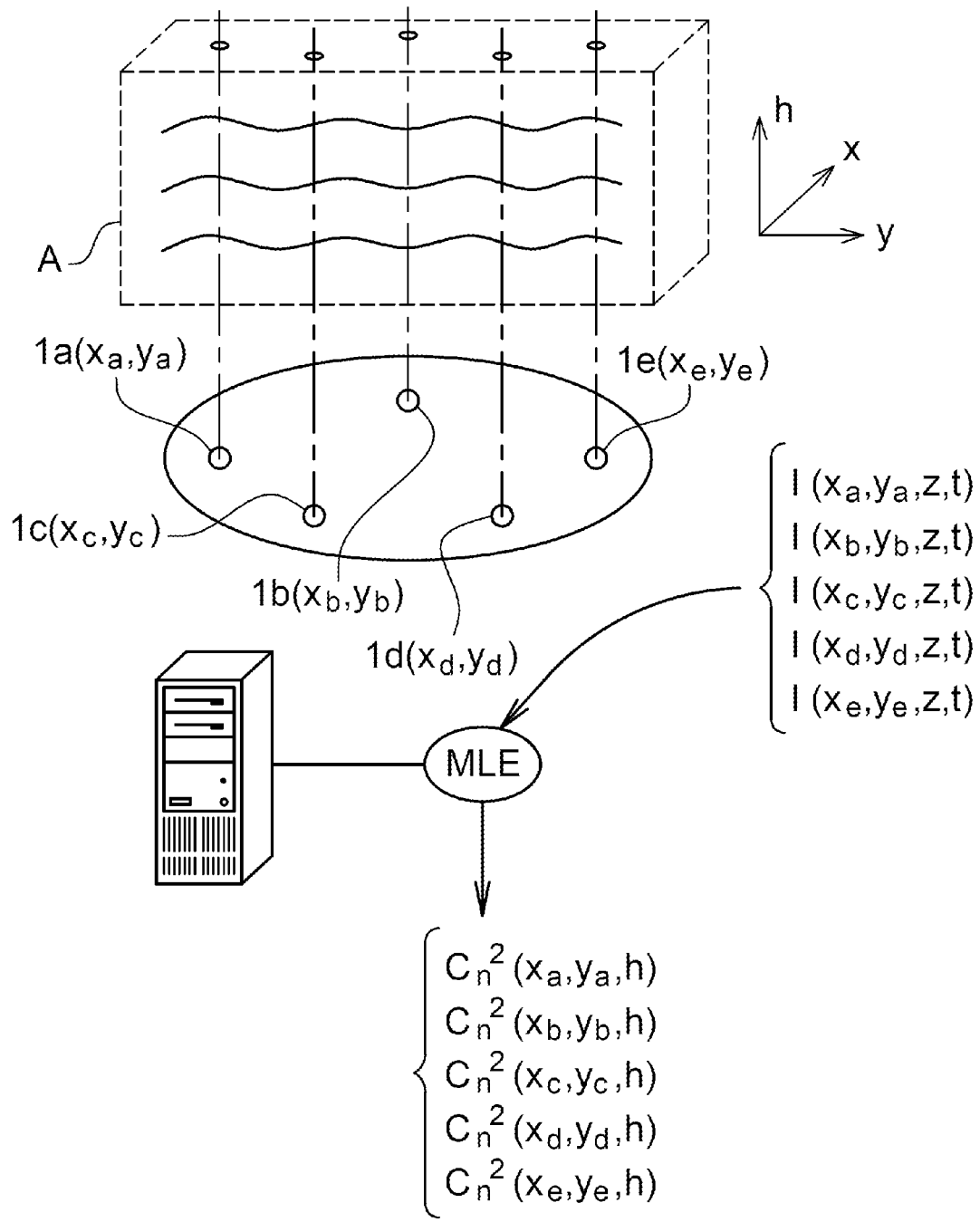

METHOD AND INSTALLATION FOR ESTIMATING A CHARACTERISTIC ATMOSPHERIC TURBULENCE PARAMETER

TECHNICAL FIELD

The purposes of the invention are a method and an installation for estimating a characteristic atmospheric turbulence parameter.

The invention relates to techniques for measuring properties of the atmosphere using optical vision devices.

BACKGROUND

The earth's atmosphere is an inhomogeneous medium, which has temperature and pressure gradients, variations of chemical composition, speed and direction of the wind. All of these factors generate atmospheric turbulences that vary depending on position and on time. These atmospheric turbulences modify the trajectory and the speed of light rays that pass through the atmosphere. The consistency of the waves is degraded which results in a blurring and/or a scintillation of the objects observed from the ground. These atmospheric turbulences may also disturb satellite communications. It has therefore become necessary to study a certain number of parameters characterising atmospheric turbulence.

Some of these characteristic parameters may be deduced from the analysis of optical speckle images acquired by a telescope. The passage of a light wave through the turbulent atmosphere leads to a degradation of the wave front then having random fluctuations of the phase. This may result in a plurality of effects on the image observed through a telescope at the ground, and particularly scintillation. This scintillation phenomenon is a temporal fluctuation of the amplitude of the wave corresponding to a dilution or a concentration of the energy of the wave front. Speckles consist of small dark and shiny spots that appear fluctuating in images of the pupil of a telescope and that illustrate this scintillation phenomenon. These are high-frequency structures that correspond to interferences of the rays deviated by the turbulence. FIG. 1 illustrates a speckle image I.

FIG. 2 illustrates in a simplified way the formation of a speckle image I. The light rays R that come from a star E (infinite celestial object) form a plane wave O. By passing through the turbulent layers of the atmosphere A, the wave O' is disturbed. By aiming for the star E with a telescope 1, the image I obtained of its pupil has speckles S caused by the disturbed wave O'. The image I is acquired by means of an optical sensor 12 that is typically a CCD (Charged Coupled Device) or CMOS (Complementary Metal Oxide Semiconductor) sensor including an arrangement of pixels. In order to obtain the image I of the pupil of the telescope 1, the sensor 12 is defocused, that is to say positioned at a distance z (>0) from the focal plane Pf of said telescope.

One parameter characterising the spatial properties of atmospheric turbulence and likely to be deduced from the speckle image analysis, is the $Cn^2$ parameter that is the refractive structure parameter, measured in m-⅔. This parameter expresses the intensity of the optical contribution of atmospheric turbulence. Varying with the altitude h, it is generally noted $Cn^2(h)$. FIG. 3 illustrates an example of $Cn^2(h)$ profile.

Miscellaneous techniques known by the person skilled in the art make it possible to estimate the $Cn^2(h)$ profile from speckle images acquired in real conditions. More known methods are: the MASS (Multiple Aperture Scintillation Sensor) method [1]; the SLODAR (SLOpe Detection And Ranging) method [2; 3; 4]; the SCIDAR (SCintillation Detection And Ranging) method [5]; the generalised SCIDAR (G-SCIDAR) method [6, 7, 8]; the Stereo-SCIDAR method [9]; the PML (Profiler of Moon Limb) method [10]; the LuSci (Lunar Scintillometer) method [11]; the CO-SLIDAR (COupled SLope and ScIntillation Detection And Ranging) method [12]; the FASS (Full Aperture Seeing Sensor) method [13, 14]; etc. These methods not only require the use of dedicated measuring instruments that are complex, expensive and difficult to install, but also involve bringing into play particularly complex mathematical models for extracting a $Cn^2(h)$ profile from speckle images.

Another parameter characterising the turbulence of the atmosphere is the Fried parameter, noted r0. This parameter represents the spatial coherence width of the wave front. The parameter r0 can be expressed depending on $Cn^2(h)$ [15] and may therefore be deduced from the speckle image analysis. The wind profile V(h) (where V characterises the speed and the direction of the wind and h the altitude) is another parameter making it possible to characterise atmospheric turbulence and that may be deduced from the speckle image analysis [16, 17]. The drawbacks related to methods for estimating the $Cn^2(h)$ profile from speckle images are the same for estimating the parameter r0 or the wind profile V(h).

The patent documents CN110083977, US2019/277758 and US2012/078517 disclose other techniques used to characterise atmospheric turbulence.

One objective of the invention is to remedy all or part of the aforementioned drawbacks.

An additional objective of the invention is to be able to estimate simply, rapidly and at low cost, at least one characteristic atmospheric turbulence parameter.

Another objective of the invention is to obtain a robust, reliable and accurate method for interpreting the optical speckle images acquired in real observation conditions, in order to deduce therefrom one or more characteristic atmospheric turbulence parameters.

Yet another objective of the invention is to be able to estimate a characteristic atmospheric turbulence parameter, without having to use a dedicated complex instrumentation, but by on the contrary being able to use an amateur telescope not dedicated to this type of analysis.

SUMMARY

The solution proposed by the invention is a method for estimating a characteristic atmospheric turbulence parameter, said method including the steps of:
- training a machine learning model using, as learning data, values of the characteristic parameter with which are associated optical speckle images corresponding to defocused images of one or more stars,
- using said trained learning model to estimate said characteristic parameter from input data containing one or more optical speckle images acquired by at least one measuring telescope, which speckle images correspond to defocused images of one or more stars observed in real conditions by said telescope.

This estimation method is now based on a machine learning model and therefore on an artificial intelligence model. Once trained, the learning model is capable of automatically estimating a characteristic atmospheric turbulence parameter, particularly a $Cn^2(h)$ profile, a Field parameter r0, or a wind profile V(h). The invention even makes it possible to estimate a plurality of parameters simultaneously if the learning model is trained with a plurality of characteristic parameters such as learning data. The trained learning model may be easily implemented at low costs in an amateur telescope, without it being necessary to employ a specific dedicated instrumentation. Furthermore, the use of a machine learning model makes it possible to do without the mathematical models of the prior art, which are generally based on hypotheses, considerations, approximations and/or negligibilities that negatively affect the calculations making it possible to estimate the characteristic parameters. The invention therefore makes it possible to improve the estimation of a trained characteristic parameter.

Other advantageous features of the invention are listed below. Each of these features may be considered alone or in combination with the noteworthy features defined above. Each of these features contributes, if applicable, to solving specific technical problems defined above in the description and to which the noteworthy features defined above do not necessarily contribute. The latter may be the subject matter, if applicable, of one or more divisional patent applications:

According to one embodiment, the method consists in: —training the machine learning model using, as learning data, values of a plurality of characteristic atmospheric turbulence parameters with which are associated optical speckle images corresponding to defocused images of one or more stars; —using said trained learning model to estimate each of said characteristic parameters from input data containing one or more optical speckle images acquired by the measuring telescope.

According to one embodiment, the characteristic atmospheric turbulence parameter(s) are selected in the following list: a $Cn^2(h)$) profile where $Cn^2$ is the refractive structure parameter and h the altitude; a Fried parameter r0; a wind profile $V(h)$ where V characterises the direction and the speed of the wind and h the altitude.

According to one embodiment, the method consists in training the learning model using, as learning data, values of a characteristic atmospheric turbulence parameter, each value being associated with a speckle image actually acquired or simulated in a single defocus plane.

According to one embodiment, the method consists in using, as input data of the trained learning model, a speckle image acquired in said defocus plane.

According to one embodiment, the method consists in training the learning model using, as learning data, a plurality of values of a characteristic atmospheric turbulence parameter, each value being associated with a series of speckle images actually acquired or simulated in a plurality of defocus planes.

According to one embodiment, the method consists in using, as input data of the trained learning model, a series of speckle images acquired in said defocus planes.

According to one embodiment, the method consists in training the learning model using, as learning data, a plurality of values of a characteristic atmospheric turbulence parameter, each value being associated with a series of speckle images actually acquired or simulated in a single defocus plane and over an acquisition period.

According to one embodiment, the method consists in using, as input data of the trained learning model, a series of speckle images acquired in said defocus plane and over said acquisition period.

According to one embodiment, the method consists in training the learning model using, as learning data, a plurality of values of a characteristic atmospheric turbulence parameter, each value being associated with a plurality of series of speckle images actually acquired or simulated in a plurality of defocus planes and, for each defocus plane, over an acquisition period.

According to one embodiment, the method consists in using, as input data of the trained learning model, a plurality of series of speckle images acquired in said defocus planes and, for each said defocus plane, over said acquisition period.

According to one embodiment, the method consists of the various defocus planes that are located on either side of a focal plane.

According to one embodiment, the method comprises the steps of: —using, as learning data, speckle images simulated from values of a characteristic parameter, the simulation being performed by means of a simulation algorithm; —configuring the simulation algorithm depending on the features of the measuring telescope.

According to one embodiment, the method consists in configuring the simulation algorithm by taking into account the focal length of the measuring telescope, and/or the resolution of said measuring telescope and/or, the size of the image acquired by said measuring telescope and/or the shape of a pupil of said measuring telescope.

According to one embodiment, the method consists in using, as learning data: —optical speckle images acquired by at least one training telescope, which speckle images are formed by defocused images of one or more stars observed in real conditions by said telescope; —values of a characteristic parameter associated with said images, each value being actually measured and/or estimated by implementing one or more of the following methods: MASS, SLODAR, SCIDAR, G-SCIDAR, Stereo-SCIDAR, PML, LuSci, CO-SLIDAR, FASS, DIMM.

According to one embodiment, the method comprises the steps of: —arranging in a network a plurality of measuring telescopes, each telescope of the network having a longitudinal and latitudinal position that is specific to it; —acquiring one or more optical speckle images with each of the telescopes; —using all of said acquired images as input data of the trained learning model, in such a way as to estimate the characteristic parameter depending on the longitude and on the latitude.

Another aspect of the invention relates to an installation for estimating a characteristic atmospheric turbulence parameter, including:
a processing unit configured to train a machine learning model using, as learning data, values of the characteristic parameter with which are associated optical speckle images corresponding to defocused images of one or more stars,
at least one measuring telescope adapted to acquire one or more optical speckle images corresponding to defocused images of one or more stars observed in real conditions by said telescope,
a processing unit adapted to use said trained learning model in such a way as to estimate said characteristic parameter from input data containing the said optical speckle image(s) acquired by said measuring telescope.

BRIEF DESCRIPTION OF THE FIGURES

Other advantages and features of the invention will become more apparent upon reading the following description of a preferred embodiment, with reference to the appended drawings, produced by way of indicative and non-limiting examples and wherein:

FIG. 1 mentioned above illustrates an optical speckle image.

FIG. 2 mentioned above schematically shows in a simplified way the formation of a speckle image I.

FIG. 3 mentioned above illustrates an example of $Cn^2(h)$ profile.

FIG. 4A illustrates a first training mode of a machine learning model.

FIG. 4B illustrates a second training mode of a machine learning model.

FIG. 4C illustrates a third training mode of a machine learning model.

FIG. 4D illustrates a fourth training mode of a machine learning model.

FIG. 5 schematically shows a first embodiment of a measuring telescope acquiring a speckle image.

FIG. 6 schematically shows a second embodiment of a measuring telescope acquiring a speckle image.

FIG. 7A illustrates a first usage mode of a trained machine learning model.

FIG. 7B illustrates a second usage mode of a trained machine learning model.

FIG. 7C illustrates a third usage mode of a trained machine learning model.

FIG. 7D illustrates a fourth usage mode of a trained machine learning model.

FIG. 8 schematically shows a measuring telescope network.

DETAILED DESCRIPTION OF THE EMBODIMENTS

The method and the system subject matter of the invention are likely to generate manipulations of physical elements, particularly of signals (electrical) and of digital data, capable of being stored, transferred, combined, compared, etc., and making it possible to achieve a desired result.

The invention implements one or more computer applications executed by computer equipment. For the sake of clarity, it should be understood within the meaning of the invention that "equipment does something" means "the computer application executed by a processing unit of the equipment does something". Just as "the computer application does something" means "the computer application executed by the processing unit of the equipment does something".

Also for the sake of clarity, the present invention is likely to make reference to one or more "computer processes". The latter correspond to the actions or results obtained through the execution of instructions of one or more computer applications. In addition, it should also be understood within the meaning of the invention that "a computer process is adapted to do something" means "the instructions of a computer application executed by a processing unit do something".

Also for the sake of clarity, the following precisions are added to certain terms used in the description and claims:

"Computer resource" may be understood in a non-limiting manner as: component, hardware, software, file, connection to a computer network, amount of RAM memory, hard drive space, bandwidth, processor speed, number of CPU, etc.

"Computer server" may be understood in a non-limiting manner as: computer device (hardware or software) including computer resources for performing the functions of a server and that offers services, computer, a plurality of computers, virtual server on Internet, virtual server on Cloud, virtual server on a platform, virtual server on a local infrastructure, server networks, cluster, node, server farm, node farm, etc.

"Processing unit" may be understood in a non-limiting manner as: processor, microprocessors, CPU (Central Processing Unit), GPU (Graphics Processing Unit).

"Computer application" may be understood as: software, computer program product, software or computer program, the instructions of which are particularly executed by a processing unit.

"Communication network" may be understood in a non-limiting manner as: Internet network, cellular network, satellite network, etc. It is a set of computer equipment connected together to exchange, securely or not, information and/or data according to a communication protocol (ISDN, Ethernet, ATM, IP, CLNP, TCP, HTTP, etc.) and/or via network technologies such as, but not limited to, GSM, EDGE, 2G, 3G, 4G, 5G, etc.

"Database" may be understood in a non-limiting manner as a structured and organised set of data saved on media that can be accessed by computer equipment and particularly by computer servers, and that may be queried, read and updated. Data may be inserted, retrieved, modified and/or destroyed there. The management and the access to the database may be ensured by a set of computer applications that constitute a database management system (DBMS).

As used here, unless otherwise specified, the use of ordinal adjectives "first", "second", etc., to describe an object simply indicates that various occurrences of similar objects are mentioned and does not imply that the objects thus described must be in a given sequence, whether in time, in space, in a classification or in any other manner.

Likewise, the use of the adjectives "right/left", "in front of/behind", etc., simply make it possible to describe the position of an object in the configuration of the appended figures, but does not necessarily imply that in practice, similar objects are in the same position.

"X" and/or "Y" means: X alone, or Y alone, or X and Y.

Generally, it will be appreciated that the various drawings are not drawn to scale from one figure to another or within a given figure, and particularly that the objects are arbitrarily drawn to facilitate the reading of the drawings.

The method subject matter of the invention is based on the use of a machine learning model that is trained so as to estimate at least one characteristic atmospheric turbulence parameter from optical speckle images acquired in real conditions by a telescope (designated hereafter by "measuring telescope").

The characteristic parameters likely to be estimated are particularly: a $Cn^2(h)$ profile; a Fiel parameter r0; a wind profile V(h). Other characteristic parameters are likely to be estimated by the trained machine learning model. For this, it is sufficient to use, as learning data, optical speckle images associated with another characteristic parameter sought.

Training the Learning Model

The optical speckle images used as learning data correspond to defocused images, real or simulated, of one or more stars.

According to one embodiment, the speckle images used as learning data are images acquired in real conditions by an optical instrument, particularly a telescope, designated hereafter by "training telescope". These real images are defocused images of one or more stars. This training telescope may be an instrument dedicated to the acquisition of speckle images. This may concern the same telescope as the measuring telescope or a different telescope.

According to one embodiment, the training telescope is an amateur or general public telescope, that is to say accessible on the market and not dedicated to the acquisition of speckle images. It is possible for example to use a smart telescope marketed by Unistellar® under the reference eVscope®.

The values of the characteristic parameter(s) associated with these real images acquired by the training telescope may be estimated by one or more of the known methods mentioned above: MASS, SLODAR, SCIDAR, G-SCIDAR, Stereo-SCIDAR, PML, LuSci, CO-SLIDAR, FASS, DIMM (Differential Image Motion Monitor) [26, 27], etc. The values of the characteristic parameters may also be actually measured, for example with the aid of sensors installed in atmospheric sounding balloons, as described in [18] or [19]. It is then sufficient to correlate the values actually measured with the speckle images acquired during the measurement campaign.

According to another embodiment, the speckle images used as learning data are simulated images corresponding to defocused images of one or more stars. These speckle images are simulated—or modelled—from a characteristic parameter, for example from a $Cn^2(h)$ profile, from a Fried parameter r0, from a wind profile V(h). Such speckle image simulations (scintillation screen) are particularly described in [20, 21, 22, 23, 24]. The general principle of these simulations is the following: at a given altitude h, the effect of the atmosphere on the light wave is calculated. This effect generally concerns only the phase of the wave. Based on Kolmogorov or Van Karman turbulence models, this effect is taken into account by calculating phase screens. The propagation of this disturbed wave is then calculated (for example by plane wave decomposition, by Fresnel diffraction, etc.), typically between the altitude where the phase disturbance has been induced, and the ground. Under the effect of this propagation, the phase disturbances progressively transform into amplitude disturbances of the wave (scintillation effect). Digital implementations of these calculation methods are for example described in [22, 23]. These calculations may be optimised by taking into account the phase disturbances induced at various altitudes. Python Open source libraries capable of making these calculations also exist, for example the Aotools library [25].

According to one embodiment, the simulation algorithm used for modelling the speckle images, is configured depending on the features of the measuring telescope that will be employed for the acquisition of speckle images in real conditions and that will be used as input data of the trained learning model. The simulation algorithm is developed by taking into account as parameters particularly: the focal length of the measuring telescope and/or its resolution (size of the pixels of the optical sensor) and/or the size of the acquired image (number of pixels of the optical sensor) and/or the shape of its pupil (for example: the presence of a mechanical structure at the inlet of the tube). In this manner, it is made sure that the simulated images used as learning data are similar to the real images that will be acquired by the measuring telescope. In other terms, the speckle images are simulated by applying real measuring conditions. The learning model is thereby more robust, more reliable and more accurate.

According to one embodiment, the simulated images used as learning data are refined or corrected by real images acquired by the training telescope and that correspond to the same characteristic parameters, for example to the same $Cn^2(h)$ profile, the same Fiel profile r0, the same wind profile V(h).

In order to further optimise the robustness and the accuracy of the learning model, the speckle images are advantageously simulated with variable intensities. These intensity variations correspond to the various intensities of the stars likely to be observed by the measuring telescope. This prevents the measuring telescope from being forced to generate one or more speckle images by observing in real conditions a predetermined star. The trained learning model may on the contrary accept as input data one or more speckle images coming from any star.

The machine learning is based on an artificial intelligence model. The learning database (or learning set) is the set of pairs consisting of values of characteristic parameters associated with the speckle images. The learning model used is in this sense a supervised learning model. The model uses this learning base to develop a prediction function that makes it possible to associate a new input (that is to say one or more speckle images) with an output (that is to say a $Cn^2(h)$ profile and/or a Fried parameter r0 and/or a wind profile V(h), etc.).

According to one embodiment, the learning model is based on an artificial neural network, on a Bayesian model, on a k-nearest neighbours (k-NN) algorithm, on a hidden Markov model, and in a more general way on a model that accepts the speckle image as input, and that generates as output values of one or more characteristic atmospheric turbulence parameters such as a $Cn^2(h)$ profile, a Fried parameter r0, a wind profile V(h), or any other characteristic atmospheric turbulence parameter.

FIGS. 4A to 4D illustrate various learning—or training—modes of the machine learning model ML. These training modes are exemplified by taking as characteristic atmospheric turbulence parameter a $Cn^2(h)$ profile. The person skilled in the art will easily understand that these training modes may be implemented with another characteristic parameter such as a Fried parameter r0 or a wind profile V(h). It is also possible to implement these training modes with a plurality of characteristic parameters. For example, the speckle image(s) used as learning data are simultaneously associated with a $Cn^2(h)$ profile and with a Fried parameter r0 and/or with a wind profile V(h).

A plurality of $Cn^2(h)$ profiles are used as learning data, each profile being associated with one or more speckle images. In other terms, and more generally, a plurality of values of the same characteristic parameter (that is to say a plurality of $Cn^2(h)$ profiles) are used as input data, each value (that is to say each $Cn^2(h)$ profile) being associated with one or more speckle images.

The speckle image(s) I used as learning data are real images or simulated images as explained above.

According to the embodiment of FIG. 4A, the training of the model MLa is performed by associating a single image I(z) with each $Cn^2(h)$ profile. The image I(z) is an image actually acquired or an image simulated in a single defocus plane z. The choice of this defocus plane z may be defined according to the method described in [14]. The learning database here is formed of a plurality of pairs $\{Cn^2(h)\ I(z)\}$, for example between 500 and 106 pairs.

According to the embodiment of FIG. 4B, the training of the model MLb is performed by associating a series of images I(zi) with each $Cn^2(h)$) profile. The images I(zi) here are actually acquired or simulated in a plurality of defocus planes zi (i varying from −l to +k with for example l and k between 0 mm and 3 mm). For each defocus plane zi, there is therefore a speckle image. The number of defocus planes zi may be between 2 and 1,000. The various planes zi may be located in front of and/or behind the focal plane Pf. The learning with planes zi located in front of and behind the focal plane Pf makes it possible to optimise the estimation of $Cn^2(h)$ profiles both for the high altitudes (h>10 Km) and for the low altitudes (h<500 m) [13, 14]. The learning database here is formed of a plurality of pairs $\{Cn^2\ (h)-I(zi)\}$, for example between 500 and 106 pairs. The learning of the model MLb is more efficient than the model Mla and makes it possible to obtain a better estimation once the model MLb has been trained.

According to the embodiment of FIG. 4C, the training of the model MLb is performed by associating a series of images I(z, tj) with each $Cn^2(h)$ profile. The images I(z, tj) are actually acquired or simulated in a single defocus plane z as described above with reference to the model of FIG. 4A, but over an acquisition period tj. The learning is thus also based on an analysis of the scintillation effect of the speckles. The acquisition period tj (j varying from 0 to n) may for example be between 2 ms (n=2 ms) and 2 minutes (n=2 min). The number of images I(z, tj) acquired or simulated over this period tj may for example be between 10 and 30,000. The learning database here is therefore formed of a plurality of pairs $\{Cn^2\ (h)-I(z, tj)\}$, for example between 500 and 106 pairs. The learning of the model MLc is more efficient than the model Mla and makes it possible to obtain a better estimation once the model MLc has been trained.

The embodiment of FIG. 4D is a combination of the modes of FIGS. 4B and 4C. The training of the model MLd is performed by associating a plurality of series of images I(zi, tj) with each $Cn^2(h)$ profile. The images I(zi, tj) here are actually acquired or simulated in a plurality of defocus planes zi (like for the model of FIG. 4B) and, for each defocus plane zi, over an acquisition period tj (like for the model of FIG. 4C). The learning database here is formed by a plurality of pairs $\{Cn^2\ (h)-I(zi,tj)\}$, for example between 500 and 106 pairs. The learning of the model MLd is more efficient than the models Mla, MLb and Mlc and makes it possible to obtain a better estimation once the model MLd has been trained.

The training of the model ML may be based according to the embodiment of FIG. 4A and/or according to the embodiment of FIG. 4B and/or according to the embodiment of FIG. 4C and/or according to the embodiment of FIG. 4D.

According to one embodiment, the training of the model ML is carried out by a processing unit, preferably of a computer server. The application based on this model is then implemented subsequently in a memory area of a user telescope, for example by downloading. This computer application may then be enriched, for example by updates and/or downloads from remote databases in a computer server.

Measuring Telescope Used for Acquiring Speckle Images

A measuring telescope is used for acquiring optical speckle images corresponding to defocused images of one or more stars observed in real conditions. These images may be acquired by orienting the measuring telescope to the zenith or by orienting said telescope between the horizon and the zenith, by adjusting its declination axis. These speckle images are the input data of the trained learning model.

According to one embodiment, the measuring telescope used is an instrument dedicated to the acquisition of speckles. According to another embodiment, the telescope 1 is an amateur or general public telescope, that is to say accessible on the market and not dedicated to the analysis of characteristic atmospheric turbulence parameters. It is possible for example to use a smart telescope marketed by Unistellar® under the reference eVscope®. This concerns a telescope used for observing celestial bodies such as planets, comets, nebulae, galaxies, and generally celestial—or astronomical—near or far—objects (particularly deep sky celestial bodies).

According to the embodiment of FIG. 5, the measuring telescope 1 particularly comprises a hollow body 10, an optical system 11 and a sensor 12.

The hollow body 10 is for example in the form of a hollow tube of circular section, but may be a tube of oval, square, octagonal, or other section. It is specified that the hollow body 10 is not necessarily of tubular shape, but may be of conical shape, or formed of portions of tubes or of cones for example. The hollow body 10 may be produced in metal, in plastic material, in composite material, etc. By way of example, its length is between 200 mm and 1,000 mm, its diameter is between 50 mm and 500 mm and its thickness is between 1 mm and 10 mm.

The light rays R coming from an observed star E, penetrate into the tube 10 then are reflected by a primary mirror 11, which is advantageously in the form of a pure reflection concave parabolic mirror. The light rays R reflected by the mirror 11 form, in a focal plane Pf, an image of the star E.

The sensor 12 is centred on the optical axis X-X and placed at a distance from the focal plane Pf in such a way as to acquire the image of the pupil of the telescope 1, that is to say the image of the inlet end 100 of the tube 10. This image is the speckle image of which it is sought to extract the values of the characteristic atmospheric turbulence parameter(s).

The position of the sensor 12 is noted z. This concerns the defocus plane. According to one embodiment, the sensor 12 is movable in such a way as to vary its position z. It is for example movably mounted on a longitudinal slide 120. According to another embodiment, the sensor 12 remains fixed and the configuration of the optical system is varied, particularly by moving the primary mirror 11, to vary the position of the focal plane Pf.

The sensor 12 is positioned in the focal plane Pf for a conventional use of the telescope 1 (that is to say for observing celestial bodies) and to be offset from said focal plane for implementing the method according to the invention. These positions z may be located in front of the focal plane Pf, that is to say between said focal plane and the mirror 11 and/or located behind said focal plane, that is to say between said focal plane and the inlet end 100.

The sensor 12 is preferably a CCD (Charged Coupled Device) or CMOS (Complementary Metal Oxide Semiconductor) sensor including an arrangement of pixels (preferably by generating colour images). This type of sensor 12 has small dimensions, which makes it possible to install it easily in the tube 10, while maintaining an optimum brightness. The diameter of the sensor 12 is for example between 15 mm and 30 mm.

The image data generated by the sensor 12 are transmitted to a processing unit 13. The connection between the sensor 12 and the processing unit 13 may be performed in a wired manner, or by a wireless connection, for example according to a short-range communication protocol, such as by way of non-limiting example, the Bluetooth®, Wifi®, ZigBee® protocol. According to one embodiment, the processing unit 13 is adapted to use the images acquired by the sensor 12 as input data of the trained learning model. According to another embodiment, the processing unit 13 is adapted to transmit the images acquired by the sensor 12, to a remote computer server wherein the trained learning model is implemented, which images are the input data of said model.

According to one embodiment, the measuring telescope 1 also includes one or more of the following computer resources: one or more memories 14, a wireless communication module 15, a network interface 16.

The memory(ies) 14 must be considered as a storage device also adapted to store data and/or data files. This may concern a native memory or an add-on memory such as a Secure Digital (SD) card. The trained learning model is preferably saved in this memory area 14. One or more other computer applications may also be saved in the memory area 14 and the instructions of which, when they are executed by the processing unit 13, make it possible to perform functionalities described above in the description.

The wireless communication module 15 is adapted to receive and transmit radio frequency signals to wirelessly communicate with other equipment. These radio frequency signals are preferably signals using a Bluetooth® protocol, other protocols such as ISM, Wifi®, ANT, ZIGBEE® or other, that may however be used.

The network interface 16 is adapted to establish a communication between the telescope 1 and a remote computer server and/or another item of remote electronic equipment, via a computer communication network. This network interface 16 may be directly integrated into the telescope 10 and be for example in the form of a GSM (Global System for Mobile Communication) module, making it possible for it to connect to a mobile telephone communication network.

The measuring telescope 1 may also advantageously integrate a rechargeable power supply battery 17, in such a way as to make said telescope totally autonomous.

In FIG. 1, the measuring telescope 1 integrates a display device formed from one (or two) eye piece(s) 200 provided with a display screen 201, for example an LCD (Liquid Crystal Display) or OLED (Organic Light-Emitting Diode) screen. The processing unit 13 is adapted to display the images acquired by the sensor 12 on the screen 101.

According to another embodiment, the screen 201 is integrated into a display device that is remote from the telescope 1. This concerns for example a head-mounted display (HMD) of the type described in patent document EP3400474 (GOOGLE) or a screen of a mobile terminal, for example the screen of a Smartphone or of a touch tablet. The connection between this remote display device and the telescope 1, and more particularly with the processing unit 13, may be performed via a wired connection (for example by means of a USB cable) or via a wireless connection, for example according to a short-range communication protocol, such as by way of non-limiting example, the Bluetooth®, Wifi®, ZigBee® protocol.

FIG. 6 illustrates another embodiment of the measuring telescope 1. The optical system here is formed by:
- a primary mirror 110 positioned in the tube 10, to reflect the light rays R penetrating into said tube,
- a secondary mirror 111 positioned in the tube 10 to reflect the light rays reflected by the primary mirror 110.

The primary 110 and secondary mirrors 111 are positioned on the same optical axis X-X. They are arranged in such a way that the light rays reflected by said mirrors form, in the focal plane Pf, an image of the observed star. The mirrors 110, 111 are arranged in such a way that the focal plane Pf is located in the tube 10, between the two said mirrors.

The primary mirror 110 is preferably a concave parabolic mirror having a low focal ratio (preferably less than 5). This type of mirror makes it possible to overcome spherical aberrations. The diameter of the primary mirror 110 corresponds substantially to the diameter of the tube 10.

Compared with the apparatus of FIG. 5, with primary mirror equivalent diameter and focus, the fact of bringing the focal plane Pf back between the two mirrors 110, 111 makes it possible to reduce the focal length of the optical system and the length of the telescope 1. The magnification of the celestial bodies observed is lower, but with as benefit an increase of the visual field and an increase of the brightness of the image. Thus, low brightness celestial bodies such as nebulae or galaxies can be observed with a better image quality. The image quality of bright celestial bodies such as planets or stars remains very good.

The position of the sensor 12 is noted z. As described above, the sensor 12 may be placed in various defocus positions z located on either side of the focal plane Pf. These positions may be located in front of the focal plane Pf, that is to say between said focal plane and the primary mirror 110 and/or located behind said focal plane, that is to say between said focal plane and the secondary mirror 111. As described above, the sensor 12 may be movably mounted on a longitudinal slide 120 to vary its position z. According to another embodiment, the sensor 12 remains fixed and the configuration of the optical system is varied, particularly by moving the primary mirror 110 and/or the secondary mirror 111, to vary the position of the focal plane Pf.

Using the Trained Learning Model

FIGS. 7A to 7C illustrate various usage modes of the trained learning model MLE. The trained learning model makes it possible to estimate one or more characteristic parameters from input data containing one or more optical speckle images acquired by the measuring telescope 1. These speckle images are defocused images of one or more stars observed in real conditions by the measuring telescope 1. The trained learning model MLE may be implemented directly in the measuring telescope 1, or be implemented in a remote computer server.

These usage modes are exemplified by taking as characteristic parameter to be estimated, a $Cn^2(h)$ profile. The person skilled in the art will easily understand that depending on the training of the learning model, these usage modes are also suitable for estimating one or more other characteristic parameters such as a Fried parameter r0, a wind profile V(h), etc. For input data, the trained learning model may therefore provide a plurality of output data, each corresponding to values of a specific characteristic parameter, for example: a $Cn^2(h)$ profile and a Fiel parameter r0 and a wind profile V(h).

According to the embodiment of FIG. 7A, the input data consists of a single speckle image I(z) actually acquired by the sensor 12. This speckle image I is the input data of the trained learning model MLEa. The output data is the characteristic parameter sought, here a $Cn^2(h)$ profile.

According to one embodiment, the trained learning model MLEa is the model MLa trained according to the embodiment of FIG. 4A. The input data (a single speckle image) thus corresponding to the type of learning data, so that the estimation of the $Cn^2(h)$ profile is optimised. As indicated above, the estimation of the $Cn^2(h)$ profile is even more accurate when the learning model MLa is trained with simulated speckle images, and when the simulation algorithm used is configured depending on the features of the measuring telescope 1. The real image I is acquired in a single defocus plane z. In order to optimise the estimation of the $Cn^2(h)$ profile, this defocus plane corresponds to that wherein the images used as learning data of the MLa model were simulated.

The model MLa (FIG. 4A) may also be trained with speckle images actually acquired by the training telescope. If the measuring telescope 1 is the training telescope, it is sufficient to place the sensor 12 in the same defocus plane z as that used to acquire the learning images. In other terms, the same defocus plane z is used for the acquisition of the speckle images used as learning data of the model MLa and for the acquisition of the speckle image used as input data of the trained model MLEa.

If the measuring telescope 1 is different from the training telescope (particularly in terms of its focal length and/or its resolution and/or its acquired image size and/or its pupil shape), it is advantageous to provide specific processing making it possible to adapt the measurement conditions to the learning conditions so that the input data of the trained model MLEa are equivalent to the learning data of the model MLa. The estimation of the trained learning model MLEa is then more accurate and more reliable.

In particular, if the measuring telescope 1 has a focal length ($f_{measuring}$) different from the focal length ($f_{training}$) of the training telescope, the defocus ($z_{measuring}$) of the sensor 12 of said measuring telescope should be adapted so that it is equivalent to the defocus ($z_{training}$) of the sensor of said training telescope. The corrected position of the defocus plane $z_{measuring}$ of the sensor 12 of the measuring telescope 1 may then be defined by the following formula: $z_{measuring} = z_{training} \times (f_{measuring}/f_{training})^2$. This correction is advantageously performed by the processing unit 13.

Likewise, the measuring and training telescopes may not have the same resolution, the size of the pixels of their respective optical sensor being different. It is advantageous in this case to adapt the resolution of the sensor 12 of the measuring telescope 1 so that it is equivalent to that of the training telescope. This adaptation may for example be performed according to an image processing algorithm of the type described in [28] or [29], or according to image processing software proposed by Let's Enhance® (https://letsenhance.io). This adaptation is advantageously performed by the processing unit 13.

In addition, the size of the measuring image acquired (number of pixels of the optical sensor) by the measuring telescope 1 may be different from the size of the learning image acquired by the training telescope. It is then advantageous to adapt the size of the measuring image so that it is equivalent to that of the training image. This resizing may consist in scaling, reframing, vectoring, resizing of the type based on a cubic interpolation [30], a linear [31] or non-linear interpolation (for example described in U.S. Pat. No. 6,727,908), a nearest neighbour interpolation [32], etc. This adaptation is advantageously performed by the processing unit 13.

Furthermore, the measuring and training telescopes may not have the same pupil shape. For example, the training telescope may have as tube inlet a structure supporting a secondary mirror or an optical sensor, and the shape of which is different from that of the measuring telescope 1. The shape of such a structure can be seen on the speckle images. It is therefore advantageous to provide image processing so that the shape of the structure appearing on the measuring image is equivalent to that appearing on the training image. For example, a mask reproducing the shape of the inlet structure of the training telescope may be added on the measuring image.

According to the embodiment of FIG. 7B, the input data consists of a series of speckle images $I(z_i)$ actually acquired by the sensor 12. This series of images is the input data of the trained learning model MLEb. The output data is the characteristic parameter sought, here a $Cn^2(h)$ profile. The images $I(z_i)$ are acquired in a plurality of defocus planes $z_i$ (i varying from −l to +k with for example l and k between 0 mm and 3 mm). For each defocus plane $z_i$, there is therefore a speckle image. The number of defocus planes $z_i$ may be between 2 and 1,000. The various planes $z_i$ may be located in front of and/or behind the focal plane Pf.

According to one embodiment, the trained learning model MLEb is the model MLb (FIG. 4B). The input data (a series of speckle images) thus corresponding to the type of learning data, so that the estimation of the $Cn^2(h)$ profile is optimised. As indicated above, the estimation of the $Cn^2(h)$ profile is even more accurate when the learning model MLb is trained with simulated speckle images, and when the simulation algorithm used is configured depending on the features of the measuring telescope 1. The real images $I(z_i)$ are acquired in a plurality of defocus planes $z_i$. In order to optimise the estimation of the $Cn^2(h)$ profile, these defocus planes correspond to those wherein the images used as learning data of the MLd model were simulated.

The model MLb (FIG. 4B) may also be trained with speckle images actually acquired by the training telescope. If the measuring telescope 1 is the training telescope, it is sufficient to place the sensor 12 in the same defocus planes $z_i$ as those used to acquire the learning images. The same defocus planes $z_i$ are therefore used for the acquisition of the learning images of the model MLb and for the acquisition of the measuring images used as input data of the trained model MLEb.

If the measuring telescope 1 is different from the training telescope (particularly in terms of its focal length and/or its resolution and/or its acquired image size and/or its pupil shape), specific image processing is advantageously provided to adapt the measurement conditions to the learning conditions so that the input data of the trained model MLEa are equivalent to the learning data of the model MLa. The image processing relating to adapting the defocus, adapting the resolution, adapting the image size and/or adapting the image of the pupil are similar to those described with reference to FIG. 7A.

According to the embodiment of FIG. 7C, the input data consists of a series of speckle images $I(z, t_j)$ actually acquired by the sensor 12. This series of images is the input data of the trained learning model MLEc. The output data is the characteristic parameter sought, here a $Cn^2(h)$ profile. The images $I(z, t_j)$ are acquired in a single defocus plane z as described above with reference to FIG. 7A, but over an acquisition period $t_j$ (j varying from 0 to n) which is for example between 2 ms (n=2 ms) and 2 minutes (n=2 min). The number of images $I(z, t_j)$ acquired over this period $t_j$ may for example be between 10 and 30,000.

According to one embodiment, the trained learning model MLEc is the model MLc (FIG. 4C). The input data (a series of speckle images) thus corresponding to the type of learning data, so that the estimation of the $Cn^2(h)$ profile is optimised. As indicated above, the estimation of the $Cn^2(h)$ profile is even more accurate when the learning model MLc is trained with simulated speckle images, and when the simulation algorithm used is configured depending on the features of the measuring telescope 1. The real images I(z, tj) are acquired in a single defocus plane z. In order to optimise the estimation of the $Cn^2(h)$ profile, this defocus plane corresponds to that wherein the images used as learning data of the MLb model were simulated.

The model MLc (FIG. 4C) may also be trained with speckle images actually acquired by the training telescope. If the measuring telescope 1 is the training telescope, it is sufficient to place the sensor 12 in the same defocus plane z as that used to acquire the learning images and to acquire the measuring images over the same period tj. The same defocus plane z and the same acquisition period are therefore used for the acquisition of the learning images of the model MLc and for the acquisition of the measuring images used as input data of the trained model MLEc.

If the measuring telescope 1 is different from the training telescope (particularly in terms of its focal length and/or its resolution and/or its acquired image size and/or its pupil shape), specific image processing is advantageously provided to adapt the measurement conditions to the learning conditions so that the input data of the trained model MLEc are equivalent to the learning data of the model MLc. The image processing relating to adapting the defocus, adapting the resolution, adapting the image size and/or adapting the image of the pupil are similar to those described with reference to FIG. 7A.

The embodiment of FIG. 7D is a combination of the modes of FIGS. 7B and 7C. The input data consist of a plurality of series of speckle images I(zi, tj) actually acquired by the sensor 12. All of these series of images are the input data of the trained learning model MLEd. The output data is the characteristic parameter sought, here a $Cn^2(h)$ profile. The images I(zi, tj) are actually acquired in a plurality of defocus planes zi (like for the model of FIG. 7B) and over an acquisition period tj (like for the model of FIG. 7C).

According to one embodiment, the trained learning model MLEd is the model MLd (FIG. 4D). The input data (a plurality of series of speckle images) thus corresponding to the type of learning data, so that the estimation of the $Cn^2(h)$ profile is optimised. As indicated above, the estimation of the $Cn^2(h)$ profile is even more accurate when the learning model MLd is trained with simulated speckle images, and when the simulation algorithm used is configured depending on the features of the measuring telescope 1. The real images I(zi, tj) are acquired in a plurality of defocus planes zi. In order to optimise the estimation of the $Cn^2(h)$ profile, these defocus planes correspond to those wherein the images used as learning data of the MLd model were simulated.

The model MLd (FIG. 4D) may also be trained with speckle images actually acquired by the training telescope. If the measuring telescope 1 is the training telescope, it is sufficient to place the sensor 12 in the same defocus planes zi as those used to acquire the learning images and to acquire the measuring images over the same period tj. The same defocus planes zi and the same acquisition period are therefore used for the acquisition of the learning images of the model MLd and for the acquisition of the measuring images used as input data of the trained model MLEd.

If the measuring telescope 1 is different from the training telescope (particularly in terms of its focal length and/or its resolution and/or its acquired image size and/or its pupil shape), specific image processing is advantageously provided to adapt the measurement conditions to the learning conditions so that the input data of the trained model MLEd are equivalent to the learning data of the model MLd. The image processing relating to adapting the defocus, adapting the resolution, adapting the image size and/or adapting the image of the pupil are similar to those described with reference to FIG. 7A.

Networking a Plurality of Measuring Telescopes.

The use of a single measuring telescope 1 makes it possible to acquire speckle images depending on defocus positions z that make it possible to estimate a characteristic atmospheric turbulence parameter according to the altitude h, particularly a $Cn^2(h)$ profile or a wind profile V(h). Atmospheric turbulence is not, however, only inhomogeneous according to the altitude h, but also according to the longitude (x-axis in FIGS. 2, 5 and 6) and the latitude (y-axis in FIGS. 2, 5 and 6).

In order to estimate a characteristic parameter according to the longitude and the latitude of atmospheric turbulence, one solution consists in operating measurements according to the procedures explained above and by varying the declination axis and/or the ascension axis between each measurement. Thus, speckle images are obtained that are not only dependent on the defocus z and optionally on the time t—I(z,t)—but also on the longitude and on the latitude—I (x,y,z,t). This series of measurements may, however, prove to be tedious.

An alternative solution is schematically shown in FIG. 8. A plurality of measuring telescopes 1a, 1b, 1c, 1d, 1e are arranged in a network. For example, between 5 and 1,000 measuring telescopes are networked. These telescopes 1a, 1b, 1c, 1d, 1e are installed in such a way as to mesh a determined geographical area Geo, for example a town or an observation site. Each telescope 1a, 1b, 1c, 1d, 1e has a longitudinal and latitudinal position that is specific to it, respectively $x_a$-$y_a$, $x_b$-$y_b$, $x_c$-$y_c$, $x_d$-$y_d$, $x_e$-$y_e$. Each telescope 1a, 1b, 1c, 1d, 1e acquires one or more speckle images as explained above (that is to say in one or more defocus planes and/or over a temporal acquisition period) that is also dependent on the longitude and on the latitude of said telescope. These images are respectively referenced $I(x_a$-$y_a,z,t)$, $I(x_b$-$y_b,z,t)$, $I(x_c$-$y_c,z,t)$, $I(x_d$-$y_d,z,t)$, $I(x_e$-$y_e,z,t)$ in FIG. 8.

According to one embodiment, the images $I(x_a$-$y_a,z,t)$, $I(x_b$-$y_b,z,t)$, $I(x_c$-$y_c,z,t)$, $I(x_d$-$y_d,z,t)$, $I(x_e$-$y_e,z,t)$ are transmitted to a remote computer server Sery wherein the trained learning model MLE is implemented. The communication between the telescopes 1a, 1b, 1c, 1d, 1e may be carried out through a communication network, for example by means of a network interface integrated into each of the telescopes of the network 1a, 1b, 1c, 1d, 1e.

According to another embodiment, the images $I(x_a$-$y_a,z,t)$, $I(x_b$-$y_b,z,t)$, $I(x_c$-$y_c,z,t)$, $I(x_d$-$y_d,z,t)$, $I(x_e$-$y_e,z,t)$ are transmitted to a "master" measuring telescope, for example the telescope 1a, wherein the trained learning model MLE is implemented. The communication between the "slave" telescopes 1b, 1c, 1d, 1e and the "master" telescope 1a here may also be carried out through a communication network, for example by means of a network interface integrated into each of the telescopes of the network 1a, 1b, 1c, 1d, 1e.

The images $I(x_a$-$y_a,z,t)$, $I(x_b$-$y_b,z,t)$, $I(x_c$-$y_c,z,t)$, $I(x_d$-$y_d,z,t)$, $I(x_e$-$y_e,z,t)$ are the input data of the trained model MLE. The model MLE is then capable of estimating a characteristic parameter, for example a $Cn^2(h)$ profile at various longitudes and latitudes, respectively $Cn^2$ $(x_a$-$y_a,h)$, $Cn^2$ $(x_b$-$y_b,h)$, $Cn^2$ $(x_c$-$y_c,h)$, $Cn^2$ $(x_d$-$y_d,h)$, $Cn^2$ $(x_e$-$y_e,h)$. It is thus possible to characterise atmospheric turbulence according to the altitude, the longitude and the latitude.

This characterisation of the turbulence as altitude, longitude and latitude, is particularly useful. It may make it possible particularly to detect the best area where to install an observation site. It may also make it possible to detect an inversion layer formed above a town and to anticipate measures aiming to reduce the pollution (for example an alternating traffic system). Here, it is reminded that an inversion layer is a layer of air the temperature gradient of which is positive. This inversion layer behaves like a "bell" that traps the pollution, particularly that caused by road traffic or fumes from industrial chimneys. This inversion layer may be deduced from $Cn^2$ $(x_a-y_a,h)$, $Cn^2$ $(x_b-y_b,h)$, $Cn^2$ $(x_c-y_c,h)$, $Cn^2$ $(x_d-y_d,h)$, $Cn^2$ $(x_e-y_e,h)$ profiles.

The arrangement of various elements and/or means and/or steps of the invention, in the embodiments described above, must not be understood as requiring such an arrangement in all implementations. Other variants may be provided and particularly:

The optical system of the apparatus does not necessarily consist of one or more mirrors, but may include one or more lenses in addition to or in substitution of said mirrors.

Other types of sensors 12 may be envisaged. For example a sensor of the CCD, CMOS, or Foveon type, colour or black and white.

Furthermore, one or more features disclosed only in one embodiment may be combined with one or more other features disclosed only in another embodiment. Likewise, one or more features disclosed only in one embodiment may be generalised in other embodiments, even if this or these feature(s) are described only in combination with other features.

Bibliographical references cited and to which the person skilled in the art will refer to if applicable:

[1]—Tokovinin et al. Restoration of turbulence profile from scintillation indices. Mon. Not. R. Astron. Soc. 343, 891-899, 2003.

[2]—Wilson. SLODAR: measuring optical turbulence altitude with a Shack-Hartmann wavefront sensor. Mon. Not. R. Astron. Soc. 337, 103-108, 2002.

[3]—Wilson et al. Development of a portable SLODAR turbulence profiler. Proc. Soc. Photo-Opt. Instrum. Eng., Volume 5490, 2004.

[4]—Wilson et al. The Durham/ESO SLODAR optical turbulence profiler. Mon. Not. R. Astron. Soc. 399, 2129-2138, 2009.

[5]—Robert et al. Mid-infrared Shack-Hartmann wavefront sensor fully cryogenic using extended source for endo-atmospheric applications. Opt. Express 20, 2012.

[6]—Avila et al. Whole atmospheric-turbulence profiling with generalized scidar. Appl. Opt. 36, 7898-7905, 1997.

[7]—Fuchs et al. Focusing on a Turbulent Layer: Principle of the Generalized SCIDAR. Publ. Astron. Soc. Pac. 110, 86-91, 1998.

[8]—Klückers et al. Profiling of atmospheric turbulence strength and velocity using a generalized SCIDAR technique. Astron. Astrophys. Suppl. Ser. 130, 141-155, 1998.

[9]—Osborn et al. Stereo SCIDAR: Profiling atmospheric optical turbulence with improved altitude resolution. 3rd AO4ELT conference, 2013.

[10]—Ziad et al. First results of the PML monitor of atmospheric turbulence profile with high vertical resolution. Astron. Astrophys. 559, 2013.

[11]—Tokovinin et al. Near-ground turbulence profiles from lunar scintillometer. Mon. Not. R. Astron. Soc. 404, 1186-1196, 2010.

[12]—Voyez. First on-sky results of the CO-SLIDAR $Cn^2$ profiler. Opt. Express 22, 10948, 2014.

[13]—Guesalaga et al. FASS: the full aperture seeing sensor. Adaptive Optics Systems V, Proc. SPIE 9909, 99090H, July 2016.

[14]—Bechet et al. The Generalized FASS (Full Aperture Seeing Sensor): filling the lower altitudes of the $Cn^2$ profile. AO4ELT5, 2017.

[15]—Roddier. The effects of atmospheric turbulence in optical astronomy. Progress in Optics, E. Wolf, ed. North-Holland, Amsterdam, 1981, Vol. 19, pp. 281-376.

[16]—Avila et al. Atmospheric turbulence and wind profiles monitoring with generalized scidar. A&A 369, 364-372, 2001.

[17]—Caccia et al. Wind and $Cn^2$ profiling by single-star scintillation analysis. Appl. Opt. 26, 1288-1294, 1987.

[18]—Azouit et al. Optical turbulence profiling with balloons relevant to astronomy and atmospheric physics. PASP, 117, 536-543, 2005.

[19]—Abahamid et al. Seeing, outer scale of optical turbulence, and coherence outer scale at different astronomical sites using instruments on meteorological balloons. A&A 422, 1123-1127, 2004.

[20]—Johansson et al. Simulation of stellar speckle imaging. Amplitude and Intensity Spatial Interferometry II, J. B. Breckinridge, ed., Proc. SPIE 1237, pp. 372-383, 1994.

[21]—Laidlaw. Turbulence and wind velocity profiles from adaptive optics telemetry: a general and scalable solution for extremely large telescopes. Durham theses, Durham University, 2020.

[22]—Johnston et al. Modeling scintillation from an aperiodic Kolmogorov phase screen. Appl. Opt. Vol. 39. No. 26, 4761-4769, 2000.

[23]—Sedmak. Implementation of fast-Fourier-transform-based simulations of extra-large atmospheric phase and scintillation screens. Appl. Opt. Vol. 43. No. 23, 4527-4538, 2004.

[24]—Lane et al. Simulation of a Kolmogorov phase screen. Waves Random Media 2, 209-224, 1992.

[25]—Townson et al. A Otools—a Python package for adaptive optics modelling and analysis. Opt. Express, 27, 31316, 2019.

[26]—Sarazin et al. The ESO differential image motion monitor. A&A 227, 294-300, 1990.

[27]—Kornilov et al. Combined MASS-DIMM instrument for atmospheric turbulence studies. MNRAS, 382, 2007.

[28]—Irani et al. Improving Resolution by Image Registration. Graphical models and image processing. Vol. 53, No. 3, May, pp. 231-239, 1991.

[29]—Sajjadi et al. EnhanceNet: Single image super-resolution through automated texture synthesis. IEEE International Conference on Computer Vision (ICCV), October 2017.

[30]—Keys. Cubic Convolution Interpolation for Digital Image Processing. IEEE Transactions on acoustics, speech and signal processing, Vol. ASSP-29, No. 6, 1981.

[31]—Blu et al. Linear Interpolation Revitalized. IEEE Transactions on image processing, Vol. 13, No. 5, 2004.

[32]—Rukundo et al. Nearest Neighbor Value Interpolation. IJACSA, Vol. 3, No. 4, 2012.

The invention claimed is:

1. A method for estimating a characteristic atmospheric turbulence parameter, said method including the steps of:
training a machine learning model using, as learning data, values of the characteristic parameter with which are associated optical speckle images corresponding to defocused images of one or more stars, and
estimating, using said trained learning model, said characteristic parameter from input data containing one or more optical speckle images acquired by at least one measuring telescope, which speckle images correspond to defocused images of one or more stars observed in real conditions by said telescope, wherein said characteristic atmospheric turbulence parameter is selected from the group consisting of:

a Cn2(h) profile, wherein Cn2 is a refractive structure parameter and h an altitude;

a Fried parameter r0; and a wind profile V(h), wherein V characterizes direction and speed of the wind and h the altitude.

2. The method according to claim 1, further comprising:

training a machine learning model using, as learning data, values of a plurality of characteristic atmospheric turbulence parameters with which are associated optical speckle images corresponding to defocused images of one or more stars, estimating, using said trained learning model, each of said characteristic parameters from input data containing one or more optical speckle images acquired by the measuring telescope.

3. The method according to claim 1, further comprising training the learning model using, as learning data, values of a characteristic atmospheric turbulence parameter, each value being associated with a speckle image actually acquired or simulated in a single defocus plane (z).

4. The method according to claim 3, further comprising using, as input data of the trained learning model, a speckle image acquired in said defocus plane.

5. The method according to claim 1, further comprising training the learning model using, as learning data, a plurality of values of a characteristic atmospheric turbulence parameter, each value being associated with a series of speckle images actually acquired or simulated in a plurality of defocus planes.

6. The method according to claim 5, further comprising using, as input data of the trained learning model (MLEb), a series of speckle images acquired in said defocus planes (zi).

7. The method according to claim 6, wherein the various defocus planes are located on either side of a focal plane.

8. The method according to claim 5, wherein the various defocus planes are located on either side of a focal plane.

9. The method according to claim 1, further comprising training the learning model using, as learning data, a plurality of values of a characteristic atmospheric turbulence parameter, each value being associated with a series of speckle images actually acquired or simulated in a single defocus plane and over an acquisition period.

10. The method according to claim 9, further comprising using, as input data of the trained learning model, a series of speckle images acquired in said defocus plane and over said acquisition period.

11. The method according to claim 1, further comprising training the learning model using, as learning data, a plurality of values of a characteristic atmospheric turbulence parameter, each value being associated with a plurality of series of speckle images actually acquired or simulated in a plurality of defocus planes and, for each defocus plane, over an acquisition period.

12. The method according to claim 11, further comprising using, as input data of the trained learning model, a plurality of series of speckle images acquired in said defocus planes and, for each said defocus plane, over said acquisition period.

13. The method according to claim 12, wherein the various defocus planes are located on either side of a focal plane.

14. The method according to claim 13, further comprising the steps of:

using, as learning data, speckle images simulated from values of a characteristic parameter, the simulation being performed by means of a simulation algorithm, and configuring the simulation algorithm depending on characteristics of the measuring telescope.

15. The method according to claim 13, further comprising configuring the simulation algorithm by taking into account the focal length of the measuring telescope, and/or the resolution of said measuring telescope and/or, the size of the image acquired by said measuring telescope and/or the shape of a pupil of said measuring telescope.

16. The method according to claim 11, wherein the various defocus planes are located on either side of a focal plane.

17. The method according to claim 1, further comprising using, as learning data:

optical speckle images acquired by at least one training telescope, which speckle images are formed by defocused images of one or more stars observed in real conditions by said telescope, and values of a characteristic parameter associated with said images, each value being actually measured and/or estimated by implementing one or more of the following methods: MASS, SLODAR, SCIDAR, G-SCIDAR, Stereo-SCIDAR, PML, LuSci, CO-SLIDAR, FASS, DIMM.

18. The method according to claim 1, further comprising the steps of:

arranging in a network a plurality of measuring telescopes, each telescope of the network having a longitudinal and latitudinal position that is specific to it, acquiring one or more optical speckle images with each of the telescopes, and using all of said acquired images as input data of the trained learning model, in such a way as to estimate the characteristic parameter depending on the longitude and on the latitude.

19. An installation for estimating a characteristic atmospheric turbulence parameter, according to the method in accordance with claim 1, including:

a processing unit configured to train a machine learning model using, as learning data, values of the characteristic parameter with which are associated optical speckle images corresponding to defocused images of one or more stars, at least one measuring telescope adapted to acquire one or more optical speckle images corresponding to defocused images of one or more stars observed in real conditions by said telescope, and a processing unit adapted to use said trained learning model in such a way as to estimate said characteristic parameter from input data containing the said optical speckle image(s) acquired by said measuring telescope.

* * * * *